US008300097B2

(12) United States Patent
Ito (10) Patent No.: US 8,300,097 B2
(45) Date of Patent: Oct. 30, 2012

(54) MONITOR DEVICE FOR DISPLAYING WORK CONDITIONS

(75) Inventor: Takeo Ito, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 943 days.

(21) Appl. No.: 11/915,206

(22) PCT Filed: May 23, 2006

(86) PCT No.: PCT/JP2006/310237
§ 371 (c)(1),
(2), (4) Date: Nov. 21, 2007

(87) PCT Pub. No.: WO2006/126532
PCT Pub. Date: Nov. 30, 2006

(65) Prior Publication Data
US 2008/0297600 A1 Dec. 4, 2008

(30) Foreign Application Priority Data
May 24, 2005 (JP) .................................. 2005-150918

(51) Int. Cl.
*H04N 7/18* (2006.01)
(52) U.S. Cl. ........................................................ 348/143
(58) Field of Classification Search .................. 348/143, 348/148, 837
See application file for complete search history.

(56) References Cited

U.S. PATENT DOCUMENTS

| 5,126,620 | A | * | 6/1992 | Haraga et al. ................. | 313/111 |
| 5,253,438 | A | * | 10/1993 | Norizuki et al. ................ | 40/511 |
| 6,477,040 | B2 | * | 11/2002 | Horiki ......................... | 361/679.3 |
| 7,590,382 | B2 | * | 9/2009 | Schedivy ...................... | 455/3.06 |
| 7,857,382 | B2 | * | 12/2010 | Vitito .......................... | 297/217.3 |
| 7,894,003 | B2 | * | 2/2011 | Chang .......................... | 348/837 |
| 2003/0137584 | A1 | * | 7/2003 | Norvell et al. ................. | 348/61 |
| 2004/0227861 | A1 | * | 11/2004 | Schedivy ...................... | 348/837 |
| 2005/0012818 | A1 | * | 1/2005 | Kiely et al. .................... | 348/143 |
| 2005/0151844 | A1 | * | 7/2005 | Chiao et al. ................... | 348/148 |
| 2005/0151845 | A1 | * | 7/2005 | Tsukada et al. ................ | 348/148 |
| 2005/0225633 | A1 | * | 10/2005 | Diederiks et al. ............. | 348/143 |

FOREIGN PATENT DOCUMENTS

| JP | 64051983 U | 3/1989 |
| JP | 1300775 A | 12/1989 |
| JP | 8053034 A | 2/1996 |
| JP | 2002-047694 A | 2/2002 |
| JP | 2003-312315 A | 11/2003 |
| JP | 2004-133350 A | 4/2004 |
| JP | 3698429 B2 | 9/2005 |

OTHER PUBLICATIONS

Notification of Reasons for Rejection issued Feb. 17, 2011 in Japanese Application No. JP2005-150918, including English translation (4 pages).

* cited by examiner

*Primary Examiner* — Robert B Harrell
(74) *Attorney, Agent, or Firm* — Fish & Richardson P.C.

(57) ABSTRACT

A screen display section and a control section are formed as separate units, enabling the sections to be separated from each other and integrally assembled together through a rigid bracket. Further, the screen display section and the control section respectively independently have connector receiving spaces. By this construction, the screen display section and the control section can be separated from each other and integrated with each other when required, and even in bad weather, water drops do not enter into the insides of the screen display section and the control section and into the connector receiving spaces, which enables safe and easy separation operation and integration operation.

8 Claims, 8 Drawing Sheets

MONITOR DEVICE FOR DISPLAYING WORK CONDITIONS

CROSS REFERENCE TO RELATED APPLICATIONS

This is a U.S. national phase application under 35 U.S.C. §371 of International Patent Application No. PCT/JP2006/310237, filed May 23, 2006 and claims the benefit of Japanese Application No. 2005-150918, filed May 24, 2005. The International Application was published in Japanese on Nov. 30, 2006 as International Publication No. WO 2006/126532 under PCT Article 21(2), the contents of which are incorporated herein in their entirety.

TECHNICAL FIELD

The present invention relates to a monitor device which is provided in a construction work vehicle such as a hydraulic shovel or the like, in which a display section for displaying work conditions, vehicle rear place imaging pictures, or the like and a control section including switches and a controller for displaying work conditions, imaging pictures, or the like are manufactured as separate units, and in which the display section and the control section can be separated and can also be assembled into one unit.

BACKGROUND ART

In a construction vehicle, an earth-moving vehicle, or the like, a monitor device is installed in which a display section for knowing work conditions and a control section including a controller and switches for displaying work conditions or the like on the display section are provided. This type of monitor device includes an integral type monitor device in which the display section and control section are fabricated as a unit and a separate type monitor device in which the display section and the control section are separate units.

The integral type monitor device is disclosed, for example, in Japanese Patent Application Laid-Open No. 2002-47694 (Patent Document 1) and the separate type monitor device is disclosed, for example, in Japanese Patent Application Laid-Open No. 2003-312315 (Patent Document 2).

In the integral type monitor device disclosed in Patent Document 1, the upper half surface of a vertically elongated rectangular panel is a screen display area, the lower half surface is an operation area for various switches and the like, and display equipment and a controller are accommodated inside the panel. On the other hand, in the separate type monitor device disclosed in Patent Document 2, the screen display section and an operation section in which switches for screen display are arranged are independently separately manufactured, and an operator seated in the driver's cab can realize confirmation and operation in the same view, eliminating troublesomeness that screen operation of the monitor installed at a different view position is performed while display screen is confirmed. In this separate type monitor device according to Patent Document 2, a supplement switch box including switches having functions similar to those of switches of the operation section for monitor screen operation is provided in addition to this operation section's switches at a position adjacent to the screen display section so that the switches of the supplement switch box are operated, whereby the monitor screen operation and the monitor screen confirmation can be realized in the same view.

SUMMARY OF THE INVENTION

In the integral type monitor device disclosed in Patent Document 1, since the size of the screen display area thereof has to be small while being limited by the operation area, not only is it not easy to watch the display screen, but also it is not possible to arrange the screen display section and the operation section at different positions since the screen display section and the operation section are always a unit so that the arrangement positions thereof are determined. On the other hand, in the separate type monitor device disclosed in Patent Document 2, the screen display section together with the supplement switch box can be changed to an arbitrary place.

However, since this separate type monitor device disclosed in Patent Document 2 is based on a premise that the supplement switch box is always arranged adjacent to the screen display section and that this screen display section is arranged, being spaced apart from the switch operation section, for example, even when the operator, while being seated on the driver's seat, wants to perform the monitor screen operation and the monitor screen confirmation in the same view, it is difficult to arrange only the screen display section adjacent to the switch operation section.

The present invention has been developed to solve such conventional problems, and a main object of the present invention is to provide a separate/integral type monitor device in which separation and assembly in to one unit can be performed when required, in which water drops or the like do not enter into the respective insides of the screen display section and the control section even in poor weather, and in which separation operation and integration operation can be performed safely and easily, in a specific configuration.

Such an object can be achieved effectively through the following basic structure of the present invention.

That is, in the present invention, a monitor device provided with a screen display section for displaying work conditions of peripheral operational equipments, indoor and outdoor surroundings, or the like and a control section including a controller for various displays and various types of display switches is provided, and the basic structure thereof is a monitor device characterized in that the screen display section and the control section are formed as separate units, and the screen display section and the control section can be separated from each other and can be integrally assembled into one unit through a rigid bracket.

In a suitable aspect, the screen display section has a display panel on one surface thereof and is composed of a case body in which display driving equipments are accommodated, the switches are arranged on one surface of the control section which is composed of a case body in which the controller is accommodated, and the screen display section and the control section have spaces in parts thereof in which connectors having a harness which connect respective terminal connecting parts of the display driving equipments and the controller can be accommodated and removed.

It is desired that the screen display section has a rectangular shape and its horizontal width is wider than a horizontal width of the control section, one surface side of the control section has an arrangement area of the switches and a supporting area of the screen display section, the above-described space of the screen display section is formed on one corner portion in the horizontal width direction thereof, and the above-described space of the control section is formed on one corner portion of the display section supporting area which corresponds to the space of the screen display section at the time when the screen display section is superimposed through the bracket.

The respective spaces of the screen display section and the control section can have insertion/detachment openings for the connectors having a harness, and steps for sealing can be formed on peripheral edges of the respective openings, so that the openings can be closed by means of lid bodies through the steps. In this aspect, although closing is possible by means of the lid bodies through the steps for sealing on the peripheral edges of the openings, the steps for sealing may be omitted such that the openings can be closed by means of the lid bodies through a conventional rubber sealing material.

Further, it is desired that the bracket is formed of a metal material such as light weight aluminum alloy or the like, and similarly main material of first and second panels of the screen display section and the control section also may be formed of a metal material such as lightweight aluminum alloy or the like. It is preferred that this bracket comprises a first detachment/attachment flange having a screw-through hole for attachment/detachment from/to a rear surface of the screen display section and a second detachment/attachment flange having a screw-through hole for attachment/detachment from/to the supporting area of an upper surface of the control section. The bracket may have a triangular shape in a side view thereof, and a front surface of the screen display section faces in a slantingly upward direction. The screw-through hole may be formed as a long hole or an H-shaped hole.

According to a request by an operator, the screen display section and the control section which are integrally assembled into one body through the bracket and which are formed into panel bodies independently are removed from the bracket to be separated from each other, or the respective separated screen display section and control section are secured to the securing section of the bracket to be integrated into one unit. In this way, since the screen display section and the control section can be separated and integrated, the separated screen display section may be arranged on a position spaced apart from the control section and the installation position of the integrated screen display section and the control section may be changed arbitrarily. Thus, at any time, the operator can arrange the screen display section and the control section at a position where operation and confirmation are easy. At this time electrical connection between the screen display section and the control section is made by means of a connector having a harness, and when the screen display section and the control section are used as one unit, a short length connector having a harness is employed, so that connector parts of their both ends can be directly connected with the control section. When the screen display section and the control section are used as separate units, the screen display section and the control section are connected via another connector having a harness between the short length connectors having a harness.

When the screen display section and the control section have liquid-tight structures, in a monitor device which is disposed on a construction machine or the like which is often operated while the window or door of the cab is opened at a place where environmental conditions are particularly poor, although water of rain or the like and fine particles and the like from the outer side are likely to hit the monitor device, rain and fine particles do not enter into the inside of the case body, and the long-term use of equipments for display driving and a controller composed of an integral circuit or the like in the case body can be assured. At the same time, even if water drops try to enter into an independent space in which the connector having a harness is accommodated, it can be prevented securely; therefore, waterproof property of the connector itself does not have to be considered, so that a commercially available, general connector can be employed.

When the screen display section is constructed into a rectangular shape having a horizontal width which is wider than the width of the control section, the screen display area can be enlarged to a maximum area of the installation area allowed in the installation space of the cab. Meanwhile, one surface of the control section has the installation area for the switches and the supporting area for the screen display section. On this display section supporting area, although the control section can be fixedly secured integrally through the bracket, the accommodation space of the connector connected to the display driving equipments accommodated inside the panel can be formed independently for the screen display area which is enlarged as described above.

Meanwhile, as regards an integral type monitor device, since the display driving equipments of the screen display section and the controller composed of an integrated circuit or the like of the control section are accommodated in a single panel, its installation space does not have enough extra space, and thus connection parts of the drawing terminals thereof have to be exposed to the outside in reality. As a result, rain and the like hit the connector having a harness easily, and in order to cope with this an expensive connector having a waterproof structure has to be obtained.

Regarding this, according to the preferred aspect of the present invention, an extra space is generated in the space accommodating the display driving equipments for the part for which the display panel of the screen display section is enlarged. Further, regarding the control section also, the display section supporting area which is regarded as a screen display section originally and the switch installation area are formed on the same surface as described above, so that the part of the screen display section enlarges the inner space of the control section. In the present invention, the respective spaces enlarged in this way are employed as spaces dedicated to accommodate the connectors which is for connecting the display driving equipments and respective terminals of the controller. Their formation positions should be a corner part of the first panel and a corner part of a position where the first panel is superimposed on the first panel supporting area of the second panel through the bracket. In this way, the harness that is an electric connection line between the screen display section and the control section can be short, and when the first and second panels are assembled through the bracket, the harness does not become a hindrance. Further, when the respective connectors having a harness accommodating spaces are liquid-tight, as described above, commercially available, regular connectors having a harness can be employed.

When the insertion/detachment opening of the connector having a harness is closed by means of the lid body, although water which tries to enter into a gap between the same insertion/detachment opening and the lid body enters into the seal groove formed on the periphery of the insertion/detachment opening, it is blocked by means of the projection like frame portion formed inside the seal groove, and it does not enter into the above-described space. In order to separate or integrally assemble the screen display section and the control section via the bracket, the first and second flanges of the bracket are attached to the rear surface of the screen display section and the display section supporting part of the control section respectively, and the screws are inserted into the screw-through holes of the respective flanges. Then, the same screws are screwed into screw bores which correspond to the screen display section and the control section to assemble them into one unit, and these screws are removed to allow the screen display section and the control section to be removed from the bracket. When the screen display section and the control section are assembled into one unit, since the bracket has a triangular shape in the side view thereof, the front surface of the screen display section faces in a slant forward direction with respect to the control section arranged horizontally, so that view and recognition properties of the image displayed on the screen can be improved. When the screw-through holes are formed into long holes or H-shaped holes, the relative fixing position between the screen display section and the control section can be easily changed.

DETAILED DESCRIPTION OF THE INVENTION

A separate/integral type monitor device that is a typical embodiment of the present invention will be described below more specifically with reference to the drawings.

Figure 1:
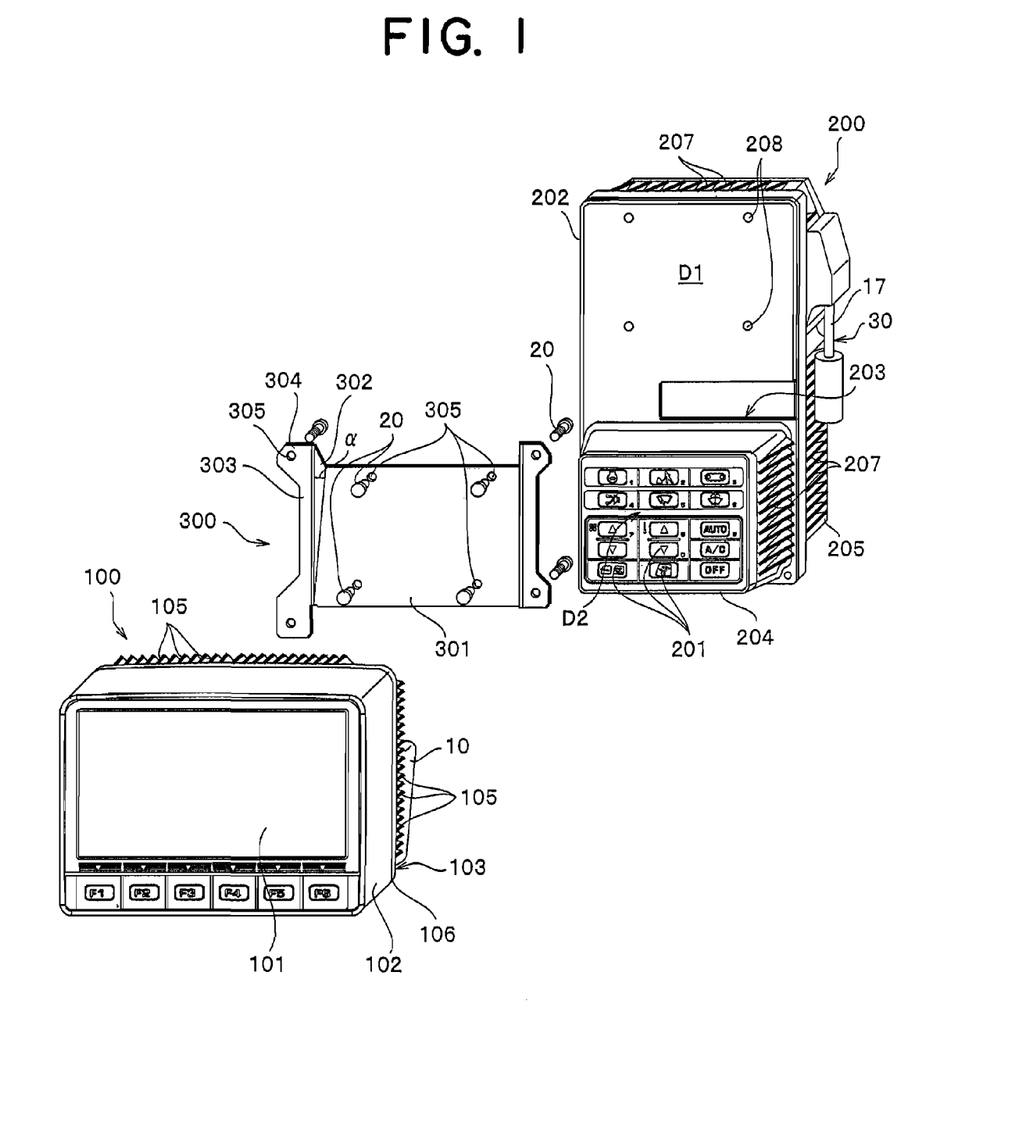
FIG. 1 is an exploded view in which a monitor device showing a typical embodiment of the present invention is seen from the front side thereof.
Figure 2:
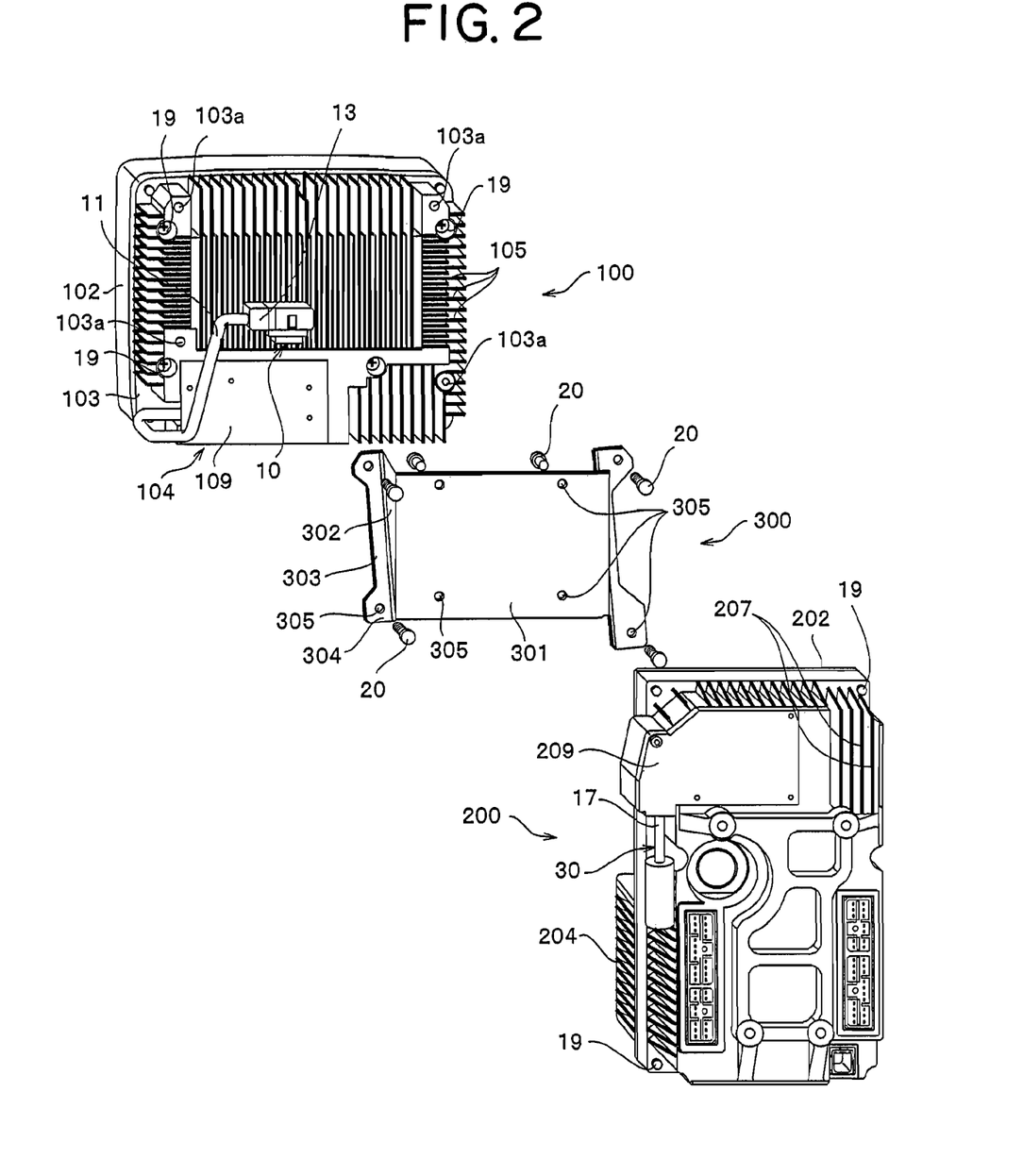
FIG. 2 is an exploded view in which the same device is seen from the rear side thereof.
Figure 3:
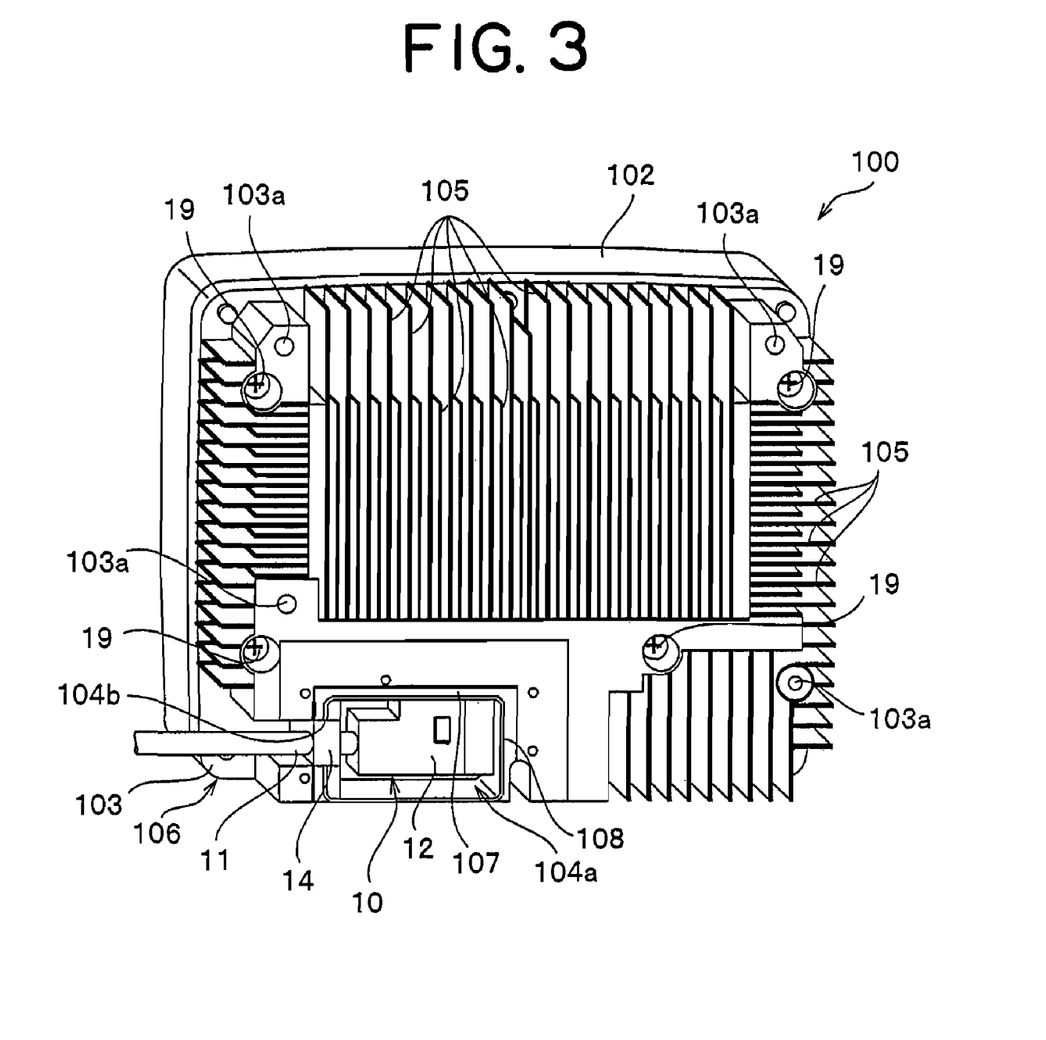
FIG. 3 is a perspective view in which the monitor device is seen from the rear side thereof and in which a lid body is removed from a screen display section of the same device.
Figure 4:
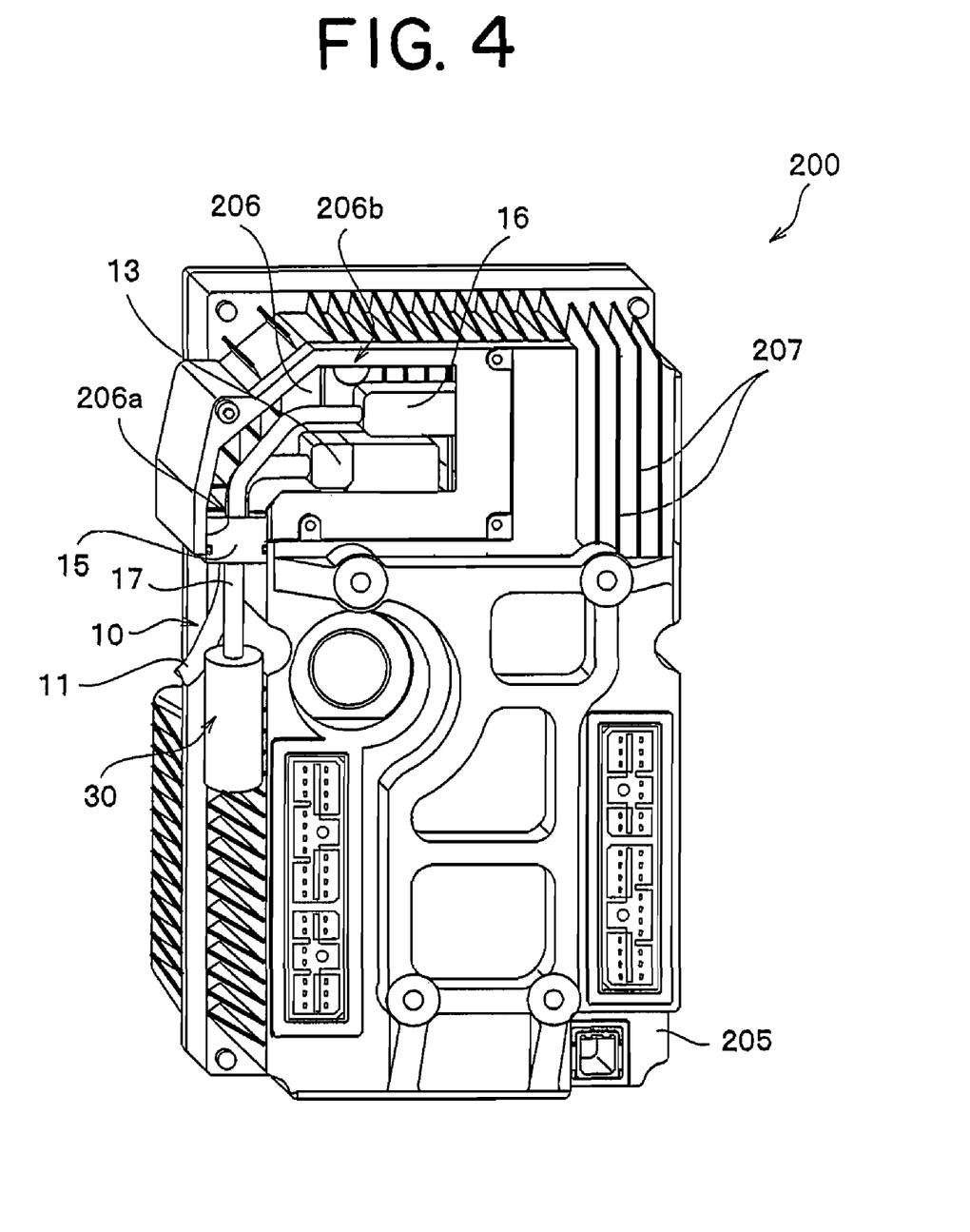
FIG. 4 is a perspective view in which the monitor device is seen from the rear side thereof and in which a lid body is removed from a control section of the same device.
Figure 5:
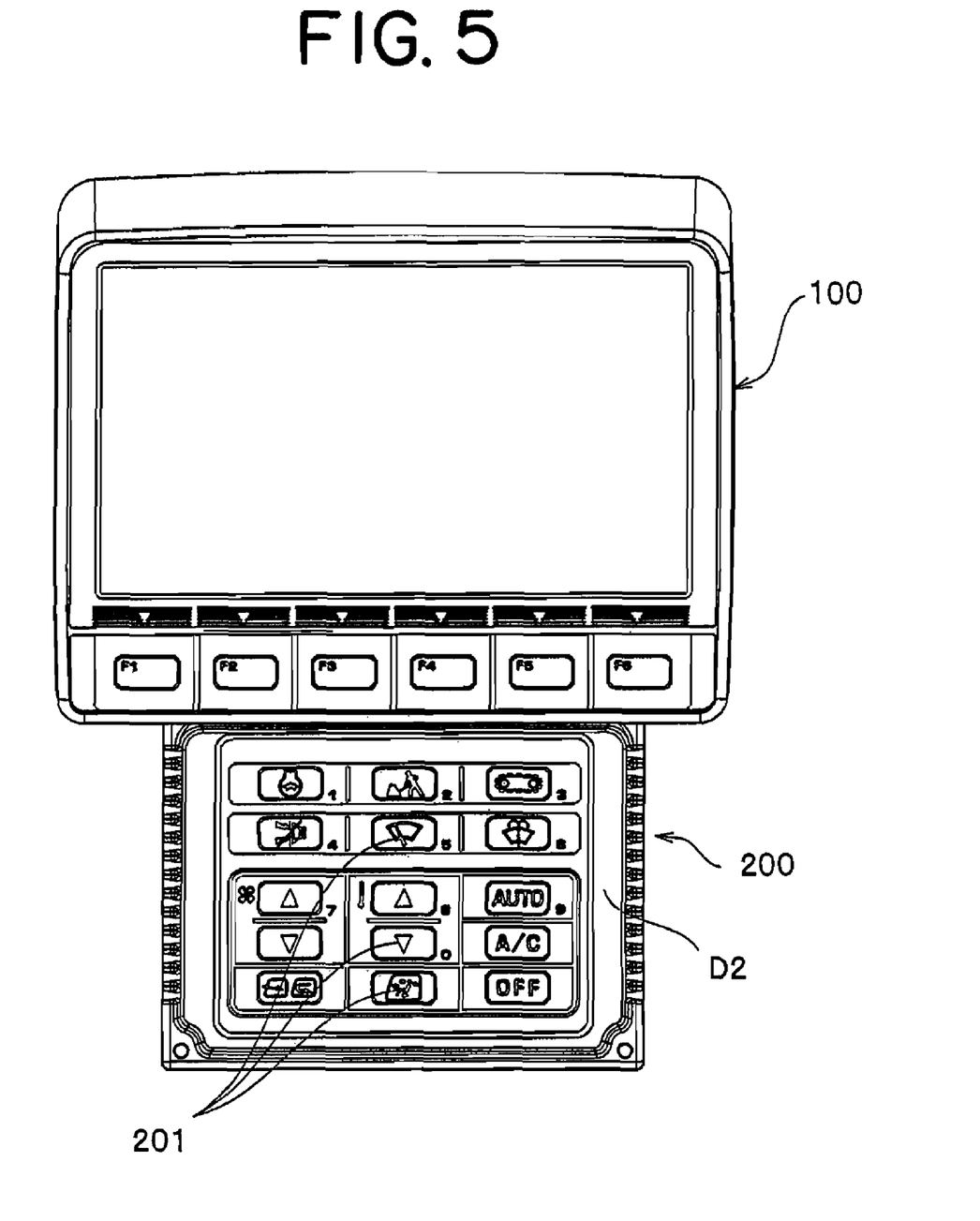
FIG. 5 is a top view of the monitor device in which the screen display section and the control section are integrally assembled through a bracket.
Figure 6:
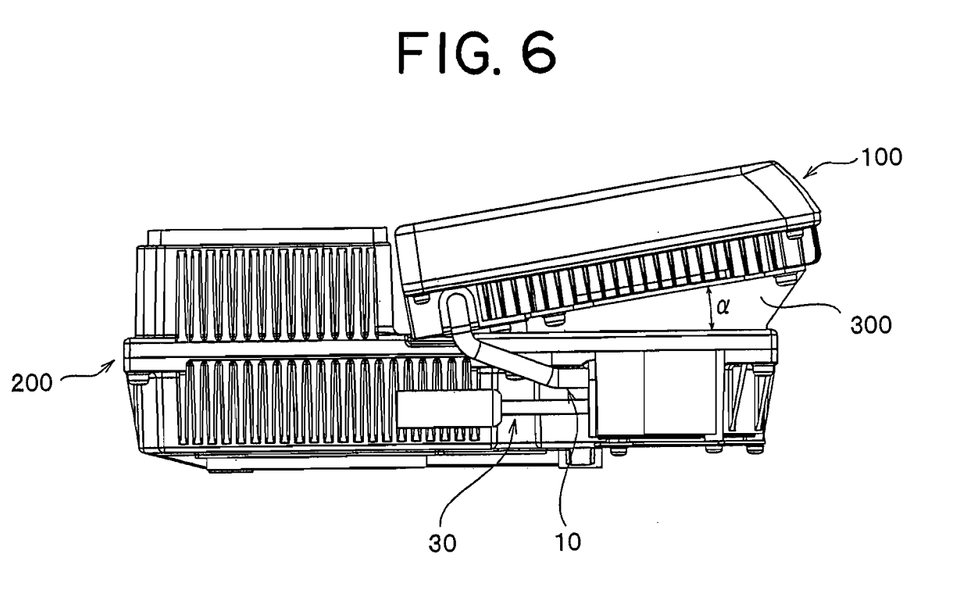
FIG. 6 is a right side view of the monitor device.
Figure 7:
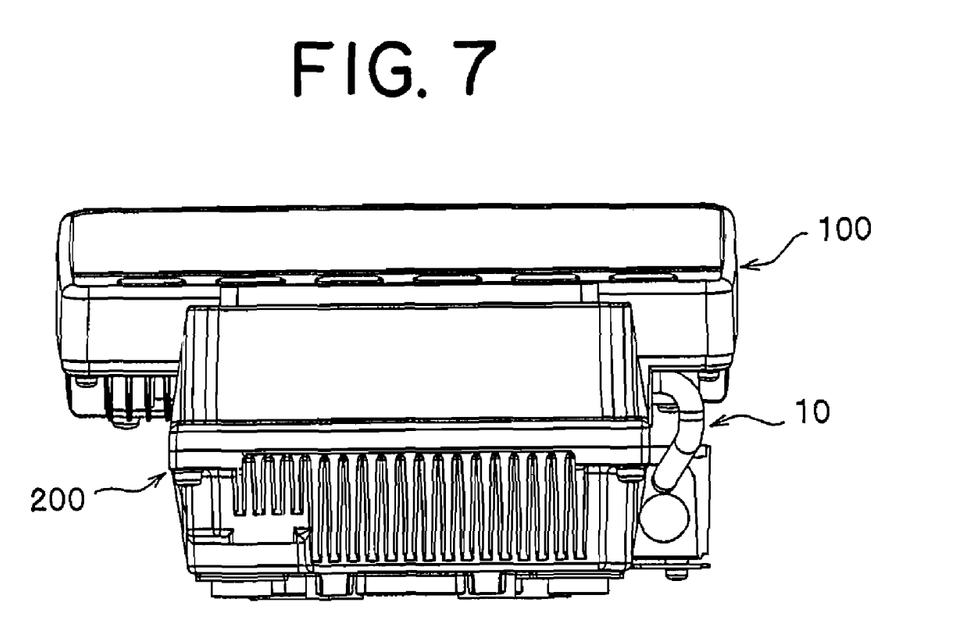
FIG. 7 is a front view of the monitor device.
Figure 8:
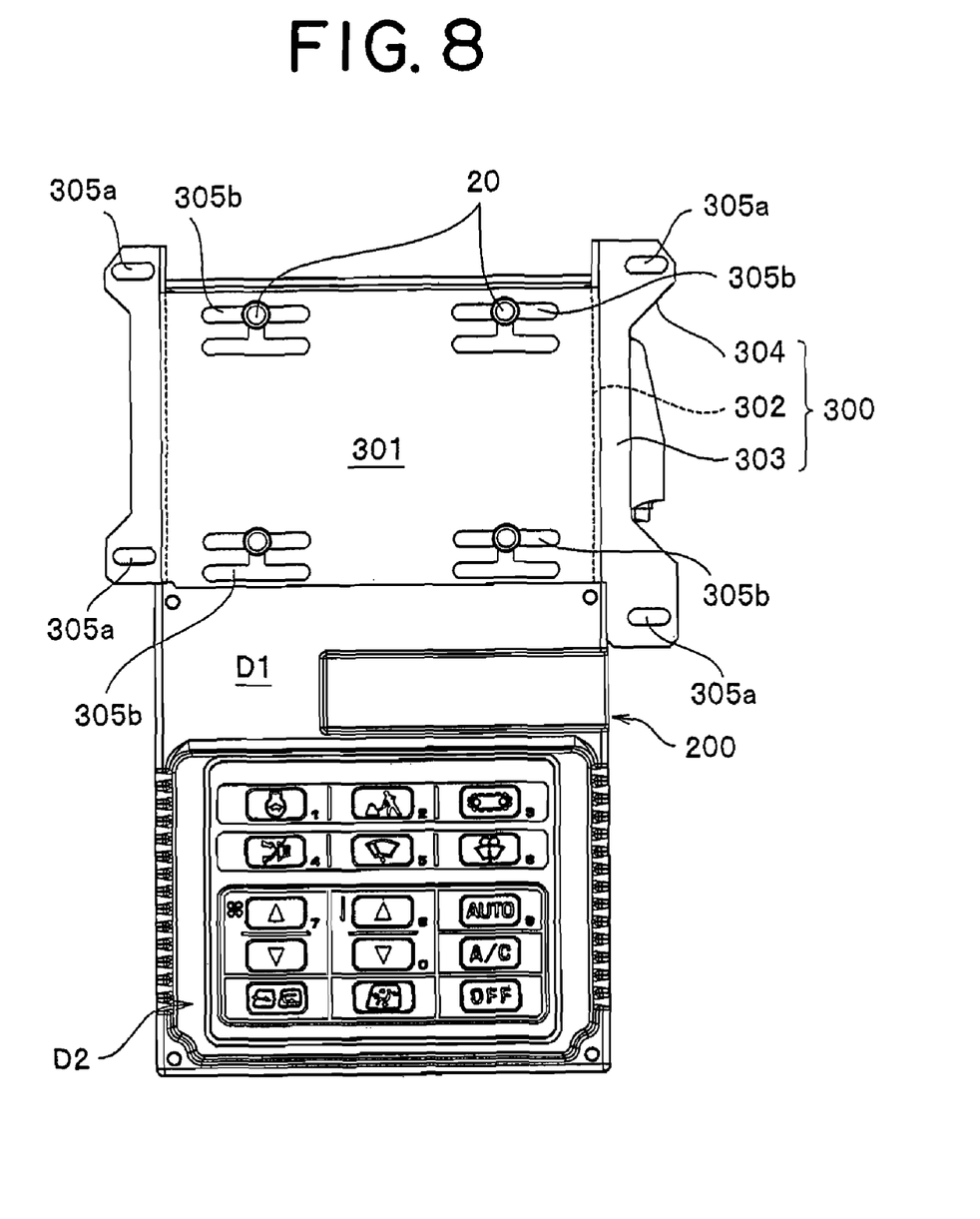
FIG. 8 is a top view of the control section at which a modification of the bracket is attached.

FIG. 1 is an exploded view in which a monitor device showing a typical embodiment of the present invention is seen from the front side thereof, FIG. 2 an exploded view in which the same device is seen from the rear side thereof, FIG. 3 a perspective view in which the same device is seen from the rear side thereof and in which a lid body is removed from a screen display section of the same device, FIG. 4 a perspective view in which the same device is seen from the rear side thereof and in which a lid body is removed from a control section of the same device, FIG. 5 a top view of the monitor device in which the screen display section and the control section of the same device are integrally assembled through a bracket, FIG. 6 a right side view of the same device, FIG. 7 a front view of the same device, and FIG. 8 a top view of the control section at which a modification of the bracket is attached.

In this embodiment, reference numeral 100 designates the screen display section, 200 the control section, and 300 the bracket for integrally coupling the screen display section 100 and the control section 200.

As shown in FIGS. 1 through 3, the screen display section 100 according to the present embodiment is composed of a horizontally elongated rectangular case body on which a screen display panel 101 is arranged on its front surface. Although illustration is omitted, a drive apparatus, a circuit, and the like for driving to display images on the screen display panel 101 are accommodated in the rectangular case body. In the present embodiment, most part of the front surface of the screen display section 100 is occupied by the display panel 101, and six function keys F1 to F6 are arranged in a horizontal line in a lower area of the same screen display panel 101. As the screen display panel 101, a liquid crystal display or an electroluminescent display can be used. A rear surface wall part 103 of this screen display section 100 and a case main body 102 supporting the screen display panel 101 are constructed such that they can be assembled and disassembled by means of screws 19. Unillustrated seal grooves are formed on the peripheries on which the rear surface wall part 103 and the case main body 102 are in contact with each other, and a seal material is fixedly fitted into either one of these grooves. A first connector receiving space 104 accommodating a connector part of one end side of a later-described first connector having a harness 10 is formed on the rear surface wall part 103, and a large number of cooling fins 105 are provided on the substantially entire surface except for a formation area of this connector receiving space 104.

As shown in FIGS. 2 and 3, the receiving space 104 is a rectangular space having the same height as that of the large number of fins 105 formed on the rear surface wall part 103. In a lower part left side corner of the rear surface wall part 103, the surface of a base portion having fin 106 of the rear surface wall part 103 is opened, along with the cooling fins 105, avoiding screw bores 103a or the like, to form an insertion/detachment opening portion 104a of the connector having a harness 10. On the base portion having fin 106 on a peripheral portion of this connector insertion/detachment opening portion 104a, a recess like seal groove 108 having a required width is continuously formed to allow a continuing thin projection like frame portion 107 to remain around the same peripheral portion. As shown in FIG. 3, a harness securing groove portion 104b communicating with the receiving space 104 is formed on a left end portion of the base portion having fin 106.

Unillustrated terminals of display driving equipments inside the screen display section 100 are gathered on an upper part inside wall portion of the receiving space 104, and a terminal connecting part connected to the first connector having a harness 10 is provided. In the first connector having a harness 10, first and second connectors 12, 13 for connecting driving terminals of unillustrated display driving equipments arranged inside the screen display section 100 with output/input terminals of unillustrated control circuit and the like arranged inside the later-described control section 200 are integrally attached to both ends of harness 11 of required length. A first fitting block piece 14 which is tightly fitted into the harness securing groove portion 104b is integrally attached to one end side of the harness 11 of this first connector having a harness 10, and a second fitting block piece 15 into which an extended end portion 206a of a connector receiving space 206 formed in the later-described control section 200 is tightly fitted is integrally attached to the other end side of the same harness 11.

In the first connector receiving space 104 formed in such a way, the first connector 12 is allowed to be connected with the driving terminal of the same receiving space 104, and a part of the harness 11 is accommodated. Thereafter, a plate like lid body 109 which has a shape similar to that of the connector insertion/detachment opening portion 104a of the same receiving space 104 is secured by means of screws 20 to be liquid-tight.

As shown in FIGS. 1, 4, 5, and 7, the control section 200 exhibits its entire outside appearance as a rectangular case body having a step in which ⅗ of an area corresponds to a display section supporting area D1 and lower ⅖ of an area corresponds to a switch arrangement area D2. The switch arrangement area D2 is formed one step higher than the display section supporting area D1. The surface (front surface) of the side on which the screen display section 100 of the display section supporting area D1 is arranged is a flat surface, and screw bores 208 for securing the bracket 300 are merely formed at four places of the upper half part thereof. On the other hand, in the switch arrangement area D2, arranged are a plurality of switches 201 which are related to various types of screen display such as cooling/warming operation conditions and ventilation circumstances in a cab, running condition, working condition, rear view of the vehicle, remaining fuel amount, presence of warning, and the like.

In the control section 200 also, similarly to the screen display section 100, the front surface part and the rear surface part can be separated and assembled by means of screws or the like, and the front surface part of the display section supporting area D1 is composed of a flat part 202. The switch arrangement area D2 extends one step higher via a step part 203 from the flat part 202, and is composed of a half case body 204 having space in which its inside is opened to the rear surface side. The entire rear surface part of the control section 200 is a rectangular case body 205 whose front surface side is opened. On an upper part left corner portion (see FIG. 4) of this rear surface part, formed is a second connector receiving space 206 accommodating the connector part of the above-described connector having a harness 10, which has the second connector 13 connected to the output/input terminal of the control section side at one end. As shown in FIG. 4, this second connector receiving space 206 bends from a side wall surface of the rear surface part of the control section 200 to extend downwardly, and its extended end portion 206a is opened downwardly. In this second connector receiving space 206 also, a liquid-tight structure similar to that of the above-described first connector receiving space 104 is adopted.

In the present embodiment, an unillustrated imaging camera is installed in a rear part of the vehicle, and its image data is sent to the control section 200 via an unillustrated connector. Thus, a second connector having a harness 30 for sending image data can be accommodated in the second connector receiving space 206 in addition to the connector having a harness 10. According to the present embodiment, the second fitting block piece 15 into which the extended end portion 206a of the second connector receiving space 206 is tightly fitted is integrally attached to the control section side end portions of the first and second connectors having a harness 10, 30. On the inner wall part of the receiving space 206, an unillustrated controller terminal composed of an integrated circuit and the like arranged inside the control section 200 are gathered, and a terminal connection part connected to the first and second connectors having a harness 10, 30 is provided. On the peripheral surface of the control section 200 except for an area on which the connectors are attached, a plurality of cooling fins 207 are formed.

With the respective terminal connection parts of the second connector receiving space 206 formed in such a way, the second connector 13 and a third connector 16 of the control section side of the first and second connectors having a harness 10, 30 are respectively connected. After parts of the harness 11 and a harness 17 are accommodated in the second connector receiving space 206, a plate like lid body 209 having a shape similar to that of the lower surface opening of the second connector receiving space 206 covers them and is secured by means of the screw 20 to be liquid-tight.

The screen display section 100 and the control section 200 constructed in such a way according to the present embodiment can be integrally assembled by means of the screws 20 via the bracket 300 illustrated in FIGS. 1 and 5, or the integrally assembled screen display section and control section 200 can be disassembled by removing the screws 20 to be independent from each other. The bracket 300 is manufactured from metal plate through sheet metal processing, and is composed of a horizontally elongated rectangular plate part 301, slender triangular plate parts 302 perpendicularly bent along left and right both ends thereof to be raised at a predetermined apex angle α, slender rectangular plate parts 303 perpendicularly bent outwardly from one side which faces left and right ends of the triangular plate parts 302 of the rectangular plate part 301, and a total of four flange parts 304 extended on the further outer sides from front and rear end portions of the rectangular plate parts 303. Respective screw-through holes 305 are formed on the four corners of the rectangular plate part 301 and on the respective flange parts 304. Screw bores 103a, 208 are respectively formed on the rear surface part of the screen display section 100 which faces these screw-through holes 305 and the portions of the display section supporting area D1 of the control section 200.

Now, in order to integrally assemble the screen display section 100 and the control section 200 which are separated from each other as shown in FIG. 1 through the bracket 300, first, the four screw-through holes 305 formed on the rectangular plate part 301 of the bracket 300 are matched with the four screw bores 208 formed on the display section supporting area D1 of the control section 200 so that the screws 20 are screwed to secure the bracket 300 to the control section 200. Thereafter, the four screw-throughholes 305 formed on the flange parts 304 of the bracket 300 are matched with the four screw bores 103a formed on the rear surface part of the screen display section 100 so that the screws 20 are screwed to secure the screen display section 100 to the bracket 300. In order to separate the separate/integral type monitor device of the present embodiment assembled in such a way into the screen display section 100, the control section 200, and the bracket 300, the screws 20 are removed through a procedure opposite to the assemble procedure described above, so that it can be separated readily.

In this way, in the present embodiment, integrally assembling the screen display section 100 and the control section 200 via the bracket 300 and removing the screen display section 100 and the control section 200 from the bracket 300 to separate them from each other are easy. Therefore, for example, the size of the display screen is not limited as in a conventional integral type monitor device. Further, in the case of the integral type monitor device, when the monitor device is installed at a determined portion, problems of view and recognition properties and switch operating property occur in the operator. However, in the present embodiment, the screen display section 100 can be installed at a place where view and recognition properties are excellent according to the will of the operator, and at the same time the control section can be arranged at a position where switching operation is easy. Of course, the screen display section 100 and the control section 200 can be integrally assembled to be used, employing the bracket 300.

The electrical connection between the screen display section 100 and the control section 200 is achieved through the first connector having a harness 10 and the second connector having a harness 30 at which the connectors 12, 13 are attached at both ends of the harness 11. When the screen display section 100 and the control section 200 are integrated to be used, the length of the first connector having a harness 10 can be short, and the connectors 12, 13 at both the ends may be directly connected with the connector receiving spaces 104, 206 of the screen display section 100 and the control section 200, respectively, so that a compact formation can be utilized. On the other hand, when the screen display section 100 and the control section 200 are separated to be used, unillustrated another connector having a harness may be employed for connecting the above-described short length first connector having a harness 10 with the screen display section 100 or the control section 200.

Moreover, since the screen display section 100 and the control section 200 respectively have liquid-tight structures independently as described above, in the monitor device which is arranged in a construction machine or the like which is often employed under especially bad work conditions, even when water such as rain or the like and fine particles and the like hit the device from the outside, rain and fine particles do not enter the inside of the case body, and display driving equipments and various driving circuits arranged inside the screen display section 100 as well as a controller composed of various display driving control circuits and the like arranged inside the control section 200 are operated precisely for a long period of time. In addition to the liquid-tight properties of the case structures of the screen display section 100 and the control section 200, when respective connector insertion/detachment opening portions 104a, 206b of the connector receiving spaces 104, 206 formed independently from arrangement spaces of the display driving equipments, various driving circuits, and the controller are closed by means of the lid bodies 109, 209, they are liquid-tight, so that even when water drops and/or fine particles try to enter into the same spaces 104, 206, invasion is prevented securely due to their liquid-tight structures. As a result, waterproof property of the connector itself does not have to be considered, and a commercially available, general connector can be employed.

The screen display area of the screen display section 100 can be increased to the maximum area of the installation area allowed in the installation space of the cab as described above. On the other hand, the supporting area D1 of the screen display section 100 and the arrangement area D2 of the above-described switches are formed on the same surface of the control section 200. Although the screen display section 100 can be fixed on this display section supporting area D1 via the bracket 300, since the control section 200 and screen display section 100 are independent from each other, the arrangement space of the display driving equipments accommodated inside the screen display section 100 is increased by the screen display area which is increased as described above, so that the accommodation space of the first connector having a harness 10 connected with the driving terminal of the display driving equipments can be independently formed.

Regarding an integral type monitor device, since the display driving equipments of the screen display section 100 and the controller composed of integrated circuit and the like of the control section 200 are arranged in the single arrangement space, connection parts of their extension terminals have to be formed to be exposed to the outside due to the limitation of their installation space. As a result, rain and the like easily enter into the connection part of the connectors having a harness 10, 30, and an expensive connector having a special structure with a waterproof function has to be obtained for dealing with this problem.

In this regard, in the present embodiment, extra space corresponding to the expanded display panel of the screen display section 100 is generated in the installation space of the display driving equipments. Regarding the control section 200 also, although the display section supporting area D1 and the switch arrangement area D2 which are deemed to be screen display sections are normally supposed to share the same space, since the inner space of the control section 200 includes the installation space of conventional display driving equipments to be the occupation space of the controller in the present embodiment, the installation space part of the display driving equipments of the screen display section 100 is added to the controller installation space of the control section 200, so that it is enlarged. The respective spaces of the screen display section 100 and the control section 200 which are enlarged in such a way can be employed as dedicated spaces which accommodate the connectors having a harness 10, 30 for connecting the display driving equipments and each terminal of the controller. Their formation portions are also formed at corner portions of the screen display section 100 and corner portions of the display section supporting area D1 of the control section 100. With this formation, the harness 11 that is the electrical connection line between the screen display section 100 and the control section 200 can be short, and even when the screen display section 100 and the control section 200 are assembled via the bracket 300, design can be made such that the bracket 300 and the harness 11 do not interfere with each other.

Since the seal groove 108 is successively formed on the circumferential portion of the connector insertion/detachment opening portion 104a of the connector receiving space 104 formed on the base portion having fin 106 of the screen display section 100 so as to surround the connector insertion/detachment opening portion 104a, after the connector insertion/detachment opening portion 104a is closed by means of the lid body 109, even if water/moisture enters into the gap between the lid body 109 and the base portion having fin 106, it enters the seal groove 108 and is blocked by thin projection like frame portion 107 provided between the connector insertion/detachment opening portion 104a and the seal groove 108, so that it does not reach the connector insertion/detachment opening portion 104a. When the screen display section 100 and the control section 200 are assembled into one unit via the bracket 300, since the bracket 300, in the side surface view thereof, is a triangular shape which is long and thin at the apex angle α, extending from the front to the back side, the front surface of the screen display section 100 faces in a slantingly forward direction with respect to the horizontally arranged control section 200, and view and recognition properties of an image displayed on the screen is improved.

FIG. 8 shows a modification of the screw-through holes 305 formed on the bracket 300. Although the screw-through holes 305 are formed simply as circular holes in the above-described embodiment, they are formed as horizontally extending long holes 305a or 90 degree rotated H-shaped holes 305b according to this modification. When screw-through holes are formed as the long holes 305a or the 90 degree rotated H-shaped holes 305b in this way, relative securing positions between the screen display section and the control section can be changed easily to improve view and recognition properties. In this way, in the present invention, various modifications are possible within the range which does not depart from the structure described in the claims.

The invention claimed is:

1. A monitor device for a construction work machine comprising:
    a screen display section for displaying at least one of work conditions of peripheral operational equipments, and indoor and outdoor surroundings;
    a control section including a controller for various displays and various types of display switches; and
    a rigid bracket made of independent plate material wherein the screen display section and the control section are formed as separate units, and the screen display section and the control section can be separated from each other and can be integrally assembled into one unit through the rigid bracket,
    wherein the screen display section and the control section have a first space and a second space in parts thereof in which accommodation and removal of a connector having a harness connecting respective terminal connecting parts of display driving equipments and the controller are possible, and the screen display section and the control section further have the respective spaces of the screen display section and the control section has insertion/detachment openings of the connector having harness, and openable-closable lid bodies which seals the insertion/detachment openings.

2. The monitor device according to claim 1, wherein the bracket is formed of a metal material, and the bracket comprises:

a first detachment/attachment flange having a screw-through hole for detaching/attaching from/to a rear surface of the screen display section and a second detachment/attachment flange having a screw-through hole for detaching/attaching from/to the supporting area of an upper surface of the control section.

3. The monitor device according to claim 2, wherein the bracket has a triangular shape in a side view thereof, and a front surface of the screen display section faces in a slantingly upward direction.

4. The monitor device according to claim 2, wherein the screw-through hole is formed as a long hole or an H-shaped hole.

5. The monitor device according to claim 1, wherein the screen display section has a rectangular shape and a horizontal width wider than a horizontal width of the control section, wherein a surface side of the control section has an arrangement area of the switches and a supporting area of the screen display section, the first space of the screen display section is formed on a corner portion in a horizontal width direction thereof, and the second space of the control section is formed on a corner portion of the display section supporting area which matches the first space of the screen display section at a time when the screen display section is superimposed through the bracket.

6. The monitor device according to claim 5, wherein the bracket is formed of a metal material, and the bracket comprises:

a first detachment/attachment flange having a screw-through hole for detaching/attaching from/to a rear surface of the screen display section and a second detachment/attachment flange having a screw-through hole for detaching/attaching from/to the supporting area of an upper surface of the control section.

7. The monitor device according to claim 1, wherein the screen display section further comprises:

a display panel on one surface thereof; and a case body in which the display driving equipments are accommodated;

wherein the switches are arranged on a surface of the control section, the control section further comprising a case body in which the controller is accommodated.

8. The monitor device according to claim 1, wherein the respective spaces of the screen display section and the control section have insertion/detachment openings of the connector having a harness, and seal grooves are formed on peripheral edges of the respective insertion/detachment openings, wherein insertion/detachment openings and the seal grooves can be closed by lid bodies.

* * * * *